H. J. YOUNGBLOOD.
ELECTRIC HEATER.
APPLICATION FILED FEB. 28, 1920.

1,363,948.

Patented Dec. 28, 1920.

INVENTOR.
Henry J. Youngblood
BY
his ATTORNEY

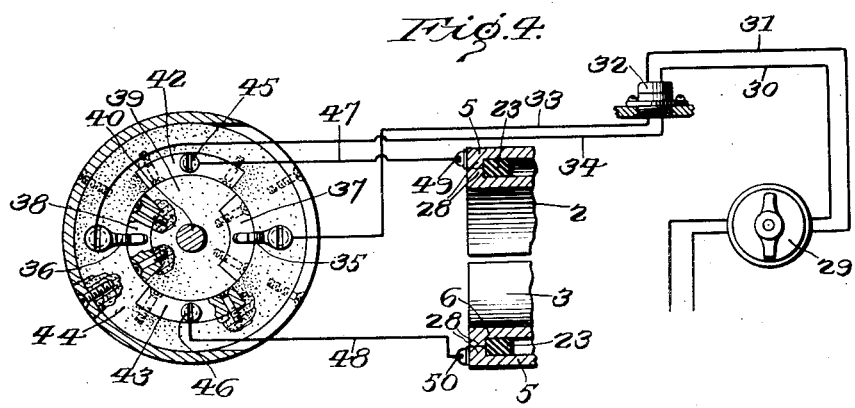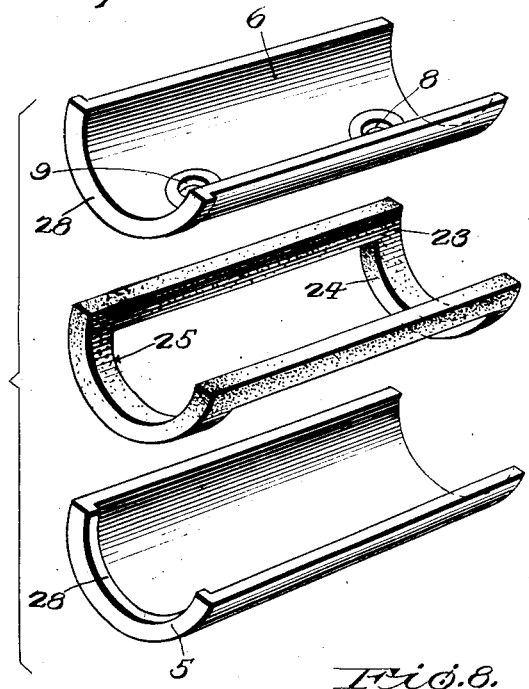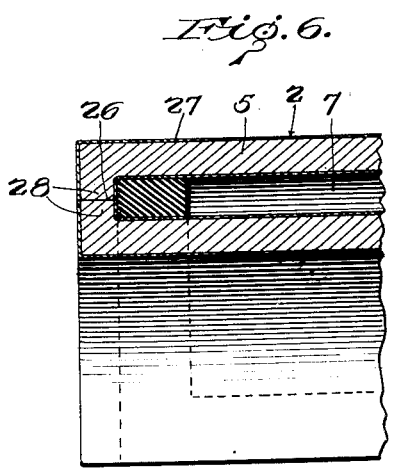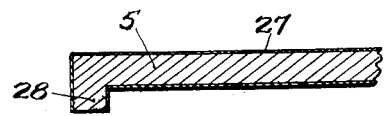

UNITED STATES PATENT OFFICE.

HENRY J. YOUNGBLOOD, OF BUFFALO, NEW YORK.

ELECTRIC HEATER.

1,363,948.  Specification of Letters Patent.  Patented Dec. 28, 1920.

Application filed February 28, 1920. Serial No. 362,043.

*To all whom it may concern:*

Be it known that I, HENRY J. YOUNGBLOOD, a citizen of the United States, residing at Buffalo, in the county of Erie and State of New York, have invented certain new and useful Improvements in Electric Heaters, of which the following is a specification, reference being had therein to the accompanying drawings.

This invention relates to an electrically heated liquid discharging faucet.

An object of this invention is the production of a combined electric heating unit and water faucet, wherein the electric current used for heating the unit is controlled by the operation of the faucet handle.

Another object of this invention is to produce a water heating faucet in combination with a novel form of electric heating unit composed of a heat producing and intensifying material which will not burn out.

With these and other objects in view the invention further consists in the arrangement and construction of the heating units hereinafter described and pointed out in the appended claims.

In the accompanying drawings forming a part of my present invention and wherein similar reference characters designate corresponding parts:—

Fig. 4 is a partial plan and diagrammatical illustration of the electrical contact and terminals associated with the faucet and heater units and the wiring therefor;

Fig. 5 is a detailed perspective view of the heating plates and interposed gasket;

Fig. 6 is an enlarged sectional view illustrating the manner in which the heating plates are abutted at one end with the enamel or shellac removed and the gasket interposed therebetween;

Fig. 7 is a detail sectional view of one end of a heating plate showing the coats of shellac or enamel; and Fig. 8 is a similar view showing the heating plate showing the shellac or enamel ground off or removed.

Figure 1:
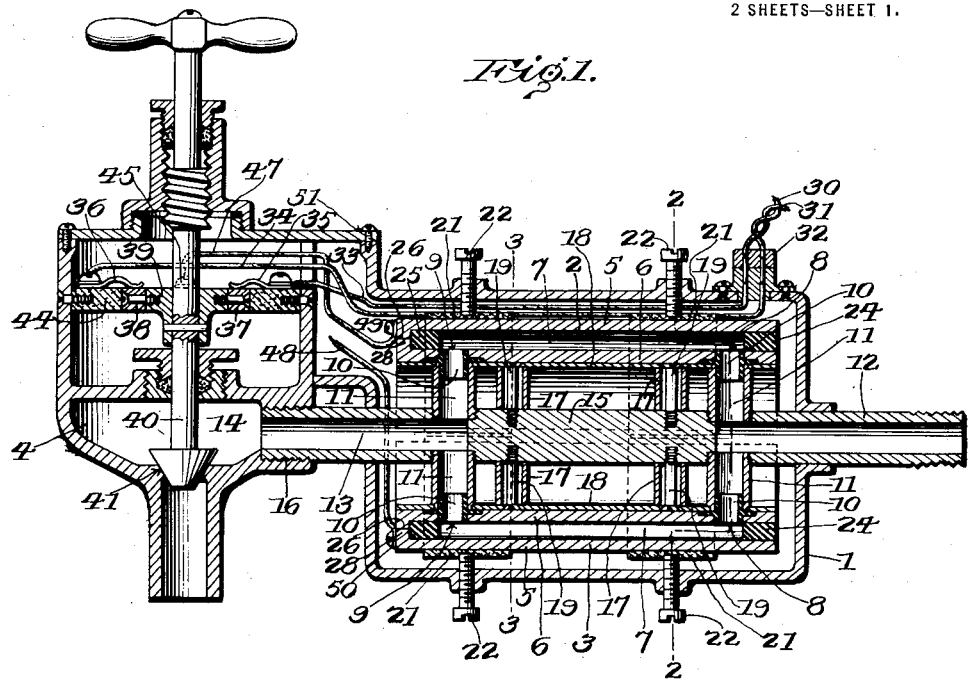
Figure 1 is a vertical sectional view through my improved faucet and heating unit.
Figure 2:
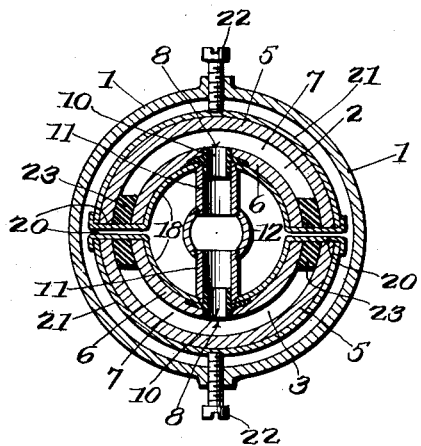
Fig. 2 is a transverse sectional view on the line 2—2 of Fig. 1.
Figure 3:
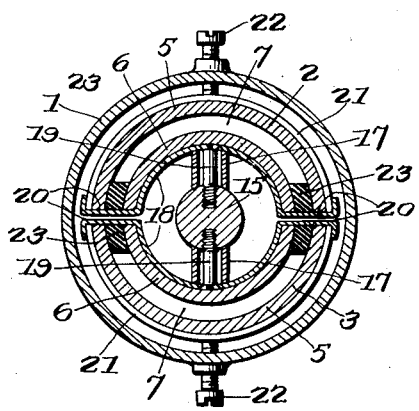
Fig. 3 is a similar view on the line 3—3 of Fig. 1.

The present invention includes as a component part thereof the utilization of a heating element, the ingredients of which tend to intensify its heat radiating qualities. The heating element comprises spaced plates between which the liquid to be heated flows. These plates are arranged to abut at one end thereof so as to provide for the passage of an electric current. Novel gaskets are used to separate these plates and prevent leakage of the liquid from the heating element. Two heating elements are preferably employed and are arranged as shown in semicylindrical and annular formation around a central support.

The water or liquid flows through the heating unit into the faucet which may be of a standard valve construction, and is discharged through a suitable nozzle or spigot end. The faucet valve stem is of novel construction and is designed to control the closing of an electric circuit so as to automatically provide for the heating and discharge of the heated liquid.

The combining of a heating element with a faucet or valve controlled spigot proves particularly useful as an attachment which can be easily applied in any household or any form of similar water distributing station.

The novel form of heating element is not limited to its use in connection with water or liquid faucets, but can be readily adapted for use in connection with other electrical devices requiring practically an instantaneous or a comparatively rapid heat, such as electric percolators, toasters, flat irons and the like.

Referring to the drawings, the invention includes a casing 1 in which is mounted the heat producing means indicated by the two heating elements 2 and 3. The faucet 4 is arranged adjacent to the heating elements and is preferably attached to the casing 1.

The heating elements 2 and 3 are each formed of separated heating units or plates 5 and 6 suitably joined together to produce the liquid circulating chamber 7. A liquid inlet 8, and a liquid outlet 9 are provided in each heating element and communicate with the chamber 7 as shown. In each inlet and outlet opening flanged washers or gaskets 10 are provided, interposed between the heating unit or plate 6 and a relatively short liquid conduit or pipe 11.

At the inlet side of the heating elements 2 and 3 the conduits 11 are in communication with an inlet pipe 12 the end of which is suitably threaded or otherwise fitted with a coupling device which can be readily attached to spigot and other forms of liquid discharging pipes, as will be understood.

The outlet ends of the heating elements communicate with a conduit 13 through which the liquid flows to the chamber 14 of the faucet 4.

As shown, the respective inlet and discharge conduits 12 and 13 are provided in a rod or pipe section 15, the intermediate portion of which is solid or otherwise restricted. This section 15 constitutes a comparatively simple support upon which to mount the heating elements, and positively connects the heating device with the faucet as indicated by the threaded end 16 which is screwed into the faucet casing, see Fig. 1.

The heating elements 2 and 3 are each of semi-circular formation, and are arranged concentrically about the supporting section 15. Suitable supporting or attaching means is provided at the end of each heating element, the said attaching means comprising loosely mounted sleeves 17 interposed between the supporting section 15 and a semi-circular plate 18 arranged to fit against the interior wall of the heating unit 6. Screws 19 are countersunk in the plate 18 and are threaded into the supporting section 15. The screws 19 pass through the sleeves 17 and when tightened tend to securely fasten the plate 18 to the section 15, thereby forming a relatively rigid support for the heating elements 2 and 3.

The semi-circular plates 18 are formed with lateral side flanges 20 the ends of which are bent over outer supporting and semi-circular plates 21. The outer supporting plates 21 are preferably of fiber and are arranged to bear against the heating unit 5 as shown. Screws 22 bear upon these plates 21 and when tightened serve to firmly clamp the heating elements 2 and 3 between the respective inner and outer plates 18 and 19. At the same time this pressure exerted by the action of the screws 22 also serves to tightly bind the respective heating units 5 and 6 together upon interposed gaskets or washers 23, thereby preventing any leakage of the liquid from the chamber 7 of the heating elements.

The gaskets or washers 23 are of semi-circular contour and are of a thickness which determines the relative spacing of the heating units 5 and 6. The gaskets 23 are fitted between the heating units 5 and 6 as shown, so as to form end walls 24 and 25 of the heating elements.

The heating units 5 and 6 at the end wall 25 of each heating element, are arranged to abut as indicated at 26, thereby permitting the electric current to flow into both heating units 5 and 6 as will be understood.

The insulation 27 which is provided upon each heating unit or plate is removed at these abutting edges, see Fig. 6.

The abutting edges of the heating units are produced by providing each unit at one end with a semi-circular flanged portion 28. By this construction a relatively large abutting area is afforded between the heating units, thereby producing a maximum contacting surface for the passage of the electric current.

The electric current may be supplied from any suitable source through a switch 29, conducting wires 30 and 31, and a suitable plug 32 preferably of the removable type. Electric conductors 33 and 34 extend from the terminal ends with which the plug coöperates, and are provided with contacts 35 and 36, respectively.

These contacts 35 and 36 are arranged to bear upon segmental plates 37' and 38 respectively, and are secured to a movable disk 39 pinned or keyed to the valve stem 40 of the valve 41 of the faucet.

Coacting segmental plates 42 and 43 are provided upon an annular section 44 of the faucet casing, and have secured thereto at 45 and 46 the terminal ends of electric conductors 47 and 48. The opposite ends of the conductors 47 and 48 are secured to the respective heating elements 2 and 3 at points indicated by the numerals 49 and 50, see Fig. 4.

In operation, when the plug 32 is inserted and the current turned on through the switch 29, the current is carried up to the respective segmental plates mounted within the faucet. When the valve stem of the faucet is revolved to discharge the liquid, the movable segmental plates 37 and 38 are turned so as to contact with the segmental plates 42 and 43, thereby closing the circuit and permitting the electric current to flow into the heating elements 2 and 3 so as to heat the liquid passing therethrough.

In practice, the chambers 7 of the heating units stand filled with liquid and upon subjecting the same to the heat instantaneously produced, in the heating elements, hot liquid begins to flow from the discharge end or nozzle of the faucet.

When it is desired to allow the liquid to flow through the faucet unheated, the electric current is cut off. In this manner a combined cold and hot water spigot or faucet may be produced capable of discharging an ample supply of either hot or cold liquid as the case might be.

The heating unit which forms an essential part of the present invention in quickly producing a maximum heat, is composed of powdered antimony and copper mixed with mercury or quicksilver by a suitable binding agent, capable of withstanding a high degree of heat. The proportion of the foregoing ingredients is predicated upon the degree of heat to which it is desired to heat the liquid. For example, should the boiling point or 212° Fahrenheit be taken as a basis, the proportional mixture consists of two parts antimony, two parts copper and one part of mercury or quicksilver. This mass is mixed in the presence of a suitable combining agent and is then subjected to a high pressure, say for example five hundred tons. While in substantially a plastic condition the material is coated with a covering of enamel and then baked in a suitable furnace under a high degree of heat, approximately 1400 to 1650 degrees.

The enamel coating hereinbefore referred to as the insulation 27, is then ground off or otherwise removed at points where it is desired to abut two plates made from the foregoing material.

The passing of an electric current through a plate made of the foregoing material tends to intensify the ingredients and produce a high degree of heat in a minimum time. The ingredients when proportioned as aforesaid may be subjected to the most intensive heat without danger of burning out.

The faucet 4 is shown as provided with suitable stuffing boxes to prevent the leakage of the liquid.

The casing 1 of the heat producing means may be attached to the faucet in any desired manner such for example as is indicated at 51 so as to completely house the several elements.

Various changes in the form and arrangement of the several parts may be resorted to, and I do not limit myself to the exact construction and arrangement herein set forth.

I claim:—

1. An electrically heated liquid discharging faucet including in combination a chambered heating element, a support for said element having inlet and outlet openings therein, a chamber communicating with said outlet opening, a valve in said chamber, means for operating the valve and means including an electric current arranged to pass through and heat the aforesaid heating element when the valve is opened.

2. An electrically heated liquid discharging faucet including in combination a chambered heating element, a central support for said element having inlet and outlet openings therein arranged to communicate with the chambered interior of the heating element at each end thereof respectively, a chamber communicating with said outlet opening, a valve in said chamber, means for operating the valve, means including an electric current for heating the aforesaid element, and means carried by said valve for closing the circuit and conducting electric current to the said heating element when the valve is opened.

3. An electrically heated liquid discharging faucet including in combination a heating element composed of spaced heating units forming a chambered interior, a gasket designed to separate the said units and form one end wall thereof, flanges provided on said heating units and arranged to abut at one end thereof, means for allowing a liquid to flow through the chambered interior of the heating element, and means including an electric current for heating the aforesaid spaced units.

4. An electrically heated liquid discharging faucet including in combination a heating element, composed of spaced heating units forming a chambered interior, a gasket interposed between the said units, means provided on said units whereby they touch each other at one or more points, inlet and outlet openings communicating with the chambered interior of the heating element, and means including an electric current for heating the aforesaid spaced units during the passage of a liquid through the discharging faucet.

5. An electrically heated liquid discharging faucet including in combination a casing, oppositely arranged heating elements semi-circularly supported within said casing, centrally arranged inlets and outlets for said heating elements, a chamber communicating with said outlets, a valve in said chamber, and means for passing an electric current through the aforesaid heating elements simultaneously when the valve is opened.

6. An electrically heated liquid discharging faucet including in combination a casing, oppositely arranged heating elements semi-circularly supported within said casing, and means including a plurality of screws carried by said casing for clamping the oppositely arranged heating elements within the casing.

7. An electrically heated liquid discharging faucet including in combination a casing, semi-circularly arranged heating elements in said casing, a central support for said heating elements, and means including a clamp carried by said casing for rigidly securing said heating elements upon the aforesaid central support.

8. An electrically heated liquid discharging faucet including in combination a casing, a chambered heating element supported therein and spaced from said casing, and means for adjustably positioning and securing said heating element within the casing aforesaid.

9. An electrically heated liquid discharging faucet including in combination a chambered heating element, a support for said element having inlet and outlet openings therein, a chamber communicating with said outlet opening, a valve in said chamber provided with a valve stem and a series of contacts carried by said valve stem for closing the circuit and conducting the current to the heating element when the valve is opened.

10. An electrically heated liquid discharging faucet including in combination a chambered heating element, a support for said element having inlet and outlet openings therein, a chamber communicating with said outlet opening, a valve in said chamber, and means located adjacent said chamber and operated by the faucet for closing an electric circuit and conducting the current to the heating element when the valve is opened.

11. An electrically heated liquid discharging faucet including in combination a chambered heating element, a support for said element having inlet and outlet openings therein, a chamber communicating with said outlet opening, a valve in said chamber provided with a valve stem, a casing arranged adjacent said chamber, co-acting electrical contacts carried by said casing and valve stem, and means including an operating handle adapted to open said valve and close the aforesaid contacts.

12. An electrically heated liquid discharging faucet including in combination a chambered heating element, a support for said element having inlet and outlet openings therein, a chamber communicating with said outlet opening, a single valve in said chamber, means carried by said valve for closing the electric circuit and conducting the current to the heating element when the valve is opened, and means including a switch for cutting off the current and allowing cold liquid to be discharged through the faucet when the valve is opened.

In testimony whereof I affix my signature.

HENRY J. YOUNGBLOOD.